United States Patent
Cook et al.

(10) Patent No.: US 6,397,685 B1
(45) Date of Patent: Jun. 4, 2002

(54) MASS FLOWMETER

(75) Inventors: Vincent Cook, Northants; Lawrence Davies, Nor Corby Northants; Neil Harrison, Duston; Yousif Hussain, Weston Favell; Chris N. Rolph, Hartwell, all of (GB)

(73) Assignee: Krohne A.G. (CH)

( * ) Notice: Subject to any disclaimer, the term of this patent is extended or adjusted under 35 U.S.C. 154(b) by 0 days.

(21) Appl. No.: 09/499,182

(22) Filed: Feb. 7, 2000

(30) Foreign Application Priority Data

Feb. 12, 1999 (DE) .......................... 199 08 072

(51) Int. Cl.$^7$ ................................ G01F 1/84
(52) U.S. Cl. ..................... 73/861.357; 73/861
(58) Field of Search ............... 73/861.357, 861.355, 73/861.356, 861, 253, 861.354

(56) References Cited

U.S. PATENT DOCUMENTS

| | | | | |
|---|---|---|---|---|
| 4,891,991 A | * | 1/1990 | Mattar et al. | 73/861.357 |
| 5,271,281 A | * | 12/1993 | Mattar et al. | 73/861.355 |
| 5,365,794 A | * | 11/1994 | Hussain et al. | 73/861.357 |
| 5,381,697 A | * | 1/1995 | van der Pol | 73/861.356 |
| 5,476,013 A | * | 12/1995 | Hussain et al. | 73/861.357 |
| 5,796,010 A | | 8/1998 | Kishiro et al. | 73/861 |
| 5,804,742 A | | 9/1998 | Rademacher | 73/861 |
| 5,827,979 A | | 10/1998 | Schott et al. | 73/861 |
| 6,158,290 A | * | 12/2000 | Hussain et al. | 73/861.357 |
| 6,170,339 B1 | * | 1/2001 | van der Pol et al. | 73/861.357 |
| 6,205,865 B1 | * | 3/2001 | Hussain et al. | 73/861.357 |

FOREIGN PATENT DOCUMENTS

| | | |
|---|---|---|
| DE | 4143361 | 3/1993 |
| DE | 19738332 | 3/1998 |
| EP | 0759542 | 2/1995 |
| EP | 0831306 A1 | 3/1995 |
| EP | 0521439 | 6/1995 |
| EP | 0837303 | 4/1998 |

OTHER PUBLICATIONS

Wolfgang Draham, Munchen, and Christian Matt, Reinach/CH Coriolis–MassedurchfluBmessung—Gerades Einrohrsystem mit meuer Schwingungskompensation, 9/98, 24–29.
Krohne, Zulassung des Corimass G–Gerates zum eichpflichtigen Verkehr.

\* cited by examiner

Primary Examiner—Benjamin R. Fuller
Assistant Examiner—Andre Allen
(74) Attorney, Agent, or Firm—Cesari and McKenna, LLP

(57) ABSTRACT

A mass flowmeter operating by the Coriolis principle and incorporating an essentially straight, moving-fluid-conducting Coriolis measuring tube, at least one oscillator associated with and exciting the Coriolis measuring tube, at least one detector associated with the Coriolis measuring tube and sensing the Coriolis forces and/or the Coriolis oscillations generated by Coriolis forces, and a compensating cylinder in which the Coriolis measuring tube is positioned, the Coriolis measuring tube and the compensating cylinder being connected to each other in which the oscillation-capable system composed of the Coriolis measuring tube and the compensating cylinder is at least to a large extent mass-equalized both for the excitation oscillation of the Coriolis measuring tube and for the Coriolis oscillation of the Coriolis measuring tube.

24 Claims, 3 Drawing Sheets

MASS FLOWMETER

This invention relates to a mass flowmeter designed to operate by the Coriolis principle, incorporating an essentially straight fluid-conducting Coriolis measuring tube, at least one oscillator associated with and exciting the Coriolis measuring tube, at least one detector associated with the Coriolis measuring tube and capturing the Coriolis forces and/or the Coriolis oscillations generated by Coriolis forces, and a compensating cylinder in which the Coriolis measuring tube is mounted by way of a mechanical connection between the Coriolis measuring tube and the compensating cylinder.

The above states that the mass flowmeter in question incorporates at least one oscillator "associated" with the Coriolis measuring tube, and at least one detector "associated" with the Coriolis measuring tube. Typically, the oscillator or oscillators, or at least part of the oscillator(s), and the detector or detectors or at least part of the detector(s), are connected to the Coriolis measuring tube. However, since such connection is not a must, the term used herein is "associated" rather than "connected".

BACKGROUND OF THE INVENTION

There are two basic types of mass flowmeters operating by the Coriolis principle, one employing a more or less straight Coriolis measuring tube, the other a looped Coriolis measuring tube. As another differentiating feature, there are mass flowmeters with only one Coriolis measuring tube and those with two Coriolis measuring tubes, in the latter case permitting either parallel or in-line flow of the fluid.

In recent times, mass flowmeters employing only one essentially straight Coriolis measuring tube have increasingly gained in popularity. Compared to mass flowmeters using either two straight Coriolis measuring tubes or one looped Coriolis measuring tube, Coriolis-type mass flowmeters with only one straight measuring tube offer significant advantages. The advantage over mass flowmeters with two straight Coriolis measuring tubes lies primarily in the fact that, in contrast to dual Coriolis measuring tubes, single-tube designs do not require a flow divider or flow combiner. Compared to single or dual looped Coriolis measuring tubes, the main advantage of the straight Coriolis tube design is that it is easier to manufacture than a looped Coriolis measuring tube, that there is less of a pressure drop in a straight Coriolis measuring tube than in a looped Coriolis measuring tube, and that a straight Coriolis measuring tube is easier to clean than a looped Coriolis measuring tube.

Still, all these advantages notwithstanding, mass flowmeters with only one straight Coriolis measuring tube present problems in a variety of ways.

First of all, in a straight Coriolis measuring tube, thermal expansion and stress cause variations in the measuring accuracy as a function of the temperature of the moving fluid. In extreme cases, thermal stress can even lead to mechanical defects such as stress-induced fissures in the Coriolis measuring tube.

The above-mentioned problems with mass flowmeters employing straight Coriolis measuring tubes have already been addressed by the industry (reference is made in particular to German patent 41 24 295, German patent disclosure 41 43 361 and the German patent 42 24 379). The problems have been largely solved, on the one hand, by connecting the Coriolis measuring tube with the compensating cylinder in such fashion that any relative movement in the axial direction is inhibited whereby the axial distance of the connecting point between the Coriolis measuring tube and the compensating cylinder defines the length of oscillation of the Coriolis measuring tube, and, on the other hand, by positioning the Coriolis measuring tube in the compensating cylinder in tensile-prestressed condition (German patent 41 24 295), and/or by producing the Coriolis measuring tube and the compensating cylinder from materials having identical or nearly identical coefficients of thermal expansion (German patent disclosure 41 43 361), and/or by providing a length-variation sensor capable of detecting changes in the oscillation length of the Coriolis measuring tube and of correcting the measurements for varying oscillation-length and stress factors (German patent 42 24 379). Most notably, it has been possible to produce a Coriolis-type mass flowmeter employing a single Coriolis measuring tube with a measuring accuracy of within about 0.1% (ref. Prospectus for the "Zulassung des Corimass G-Gerates zum elchpflichtigen Verkehr" issued by KROHNE Messtechnik GmbH & Co. KG).

However, mass flowmeters operating by the Coriolis principle and employing a straight Coriolis measuring tube do have one inherent drawback (ref. European patent disclosure 0 521 439):

It is necessary for the Coriolis measuring tube or tubes in mass flowmeters operating by the Coriolis principle to oscillate under the action of at least one oscillator; after all, it is the oscillation of the Coriolis measuring tube or tubes and the flow of mass through the Coriolis measuring tube or tubes that produces the Coriolis forces or Coriolis oscillations.

In mass flowmeters employing two straight Coriolis measuring tubes or one or two looped Coriolis measuring tube(s), the Coriolis measuring tubes or the active oscillating sections of the looped Coriolis measuring tubes are identical in design and so positioned and excited, that they oscillate in mutually opposite directions. As a desirable result, the overall oscillating structure has no external oscillating effect. The center of inertia remains stationary, compensating for any forces encountered. It follows that no oscillations are introduced into a pipeline system in which this type of mass flowmeter is installed, so that no pipeline vibrations will affect the accuracy of the measurements.

Of course, Coriolis-type mass flowmeters employing only one straight Coriolis measuring tube do not offer the benefit of counter-oscillating measuring tubes. The center of mass does not remain stationary and there is no compensation for spurious forces. As a result, a mass flowmeter of this type when installed in a pipeline will transfer vibrations into the pipe which, in turn, can affect the measuring accuracy. The industry has already addressed the task of minimizing the introduction of extraneous interferences, i.e. vibrations in the surrounding pipeline structure (ref. German patent disclosures 44 23 168 and 196 32 500).

To control the aforementioned problems which are peculiar to Coriolis-type mass flowmeters employing only one straight Coriolis measuring tube, the pipeline system in which the mass flowmeter is installed is often provided with additional clamping devices. As a rule, the pipe through which the fluid flows to the mass flowmeter and the pipe through which the fluid is carried away from the mass flowmeter are clamped down at spatial intervals corresponding to ten to fifteen times the pipe diameter.

Another proposed approach to the aforementioned problems which are peculiar to mass flowmeters operating by the Coriolis principle and employing only one straight Coriolis measuring tube, has been to install so-called antiresonators at the point where the Coriolis measuring tube is mounted, which antiresonators should have a resonant spectrum of a bandwidth that matches at least one intrinsic, natural vibration of the Coriolis measuring tube (ref. European patent disclosure 0 521 439). It has been found, however, that in the case of mass flowmeters which are very accurate to begin with, this approach offers no further improvement in terms of measuring accuracy or error reduction.

Another approach has been, especially in the case of a mass flowmeter employing only one straight Coriolis measuring tube, to mount on the compensating cylinder an equalizing unit of a symmetrical design and positioned in a symmetrical relation to the center of the Coriolis measuring tube (German patent disclosure 197 10 806). That equalizing unit must be so designed that the oscillation amplitude of the compensating cylinder is minimal and preferably close to zero.

Finally, it has recently been proposed that for a mass flowmeter with only one straight Coriolis measuring tube both the excitation oscillation and the Coriolis oscillation of the Coriolis measuring tube within the compensating cylinder be balanced (ref. German patent disclosure 198 40 782). The term "balanced" in this case refers to a situation where the compensating cylinder is affected neither by the excitation oscillation nor by the Coriolis oscillation. In other words, neither the excitation oscillation nor the Coriolis oscillation will induce a "compensating-cylinder oscillation"; the compensating cylinder remains unaffected, or "in a state of equilibrium". That invention thus recognizes the fact that any further improvement in a Coriolis-type mass flowmeter employing only one essentially straight Coriolis measuring tube is attainable only by keeping the center of mass of the entirety of the components contained in the compensating cylinder stationary, i.e. the center of mass of the entire assembly encompassing the Coriolis measuring tube, the oscillator or oscillators and the detector or detectors must remain stationary. If there are any other components located within the compensating cylinder, they, too, must, of course, be included in the "stationary center-of-mass" design.

SUMMARY OF THE INVENTION

It is the objective of this invention to further improve on the earlier design of the mass flowmeter employing the Coriolis principle, with regard to the problems detailed above which stem from the use of a single straight Coriolis measuring tube in the mass flowmeter.

The mass flowmeter according to this invention, the design of which solves the problems indicated and meets the stated objective, is basically and essentially characterized in that in terms of mass, the oscillation-capable system consisting of the Coriolis measuring tube and the compensating cylinder is at least to a large extent balanced relative to both the excitation oscillation of the Coriolis measuring tube and the Coriolis oscillation of the Coriolis measuring tube.

In the case of mass flowmeters of the type in question, the Coriolis measuring tube and the components of the oscillator or oscillators and the detector or detectors associated with the Coriolis measuring tube, and, respectively, the compensating cylinder and, where applicable, the components of the oscillator or oscillators and of the detector or detectors associated with the compensating cylinder, are oscillation-capable systems. Yet the assembly consisting of the Coriolis measuring tube, the oscillator or oscillators, the detector or detectors and the compensating cylinder is on its part an oscillation-capable or oscillatory system. The invention is therefore aimed at largely or, in the ideal case, completely equalizing this assembly in terms of mass relative to both the excitation oscillation of the Coriolis measuring tube and the Coriolis oscillation of the Coriolis measuring tube. The term "equalizing" in this case means that neither the excitation oscillation nor the Coriolis oscillation is "active" outside the said assembly. The invention is thus based on the determination that, for any further improvement to be attainable in a mass flowmeter operating by the Coriolis principle and employing only one essentially straight Coriolis measuring tube, the center of mass of the said assembly must remain stationary.

Following another, particularly significant underlying concept of this invention, the mass equalization for the excitation oscillation of the Coriolis measuring tube is obtained by means of a first equalizing provision and the mass equalization for the Coriolis oscillation of the Coriolis measuring tube is obtained by means of a second equalizing provision different from the first provision. This can be accomplished in various ways.

To realize the first equalizing provision for the excitation oscillation of the Coriolis measuring tube, a special approach of major significance is characterized in that a first equalizing mass is provided and is connected to the compensating cylinder in the center plane of the latter perpendicular to its longitudinal axis. It is desirable for the first equalizing mass to be so chosen, dimensioned and positioned as to make the natural resonant frequency of the compensating cylinder and the first equalizing mass substantially lower than the resonant frequency of the Coriolis measuring tube.

Particular importance is attributed to a preferred embodiment of the mass flowmeter according to this invention which is characterized in that the connection of the first equalizing mass with the compensating cylinder is rigid relative to the excitation force but soft relative to the Coriolis factor resulting from the Coriolis force. The connection between the first equalizing mass and the compensating cylinder should therefore be implemented in such fashion that the excitation oscillation of the Coriolis measuring tube acts on the first equalizing mass whereas the Coriolis oscillation of the Coriolis measuring tube has no effect, i.e. it cannot act, on the first equalizing mass.

To realize the second equalizing provision for the Coriolis oscillation of the Coriolis measuring tube, a special approach of major significance is characterized in that a second equalizing mass and a third equalizing mass are provided and that the said second equalizing mass and the said third equalizing mass are in the form of end sections of the compensating cylinder, meaning that at its two ends, the compensating cylinder transitions into the second equalizing mass and the third equalizing mass, respectively.

So far, the mass flowmeter design addressed and the mass flowmeter according to this invention have only been described in reference to their significant functional components. A mass flowmeter of the type in question usually also includes an external housing. In that case, the mass flowmeter according to this invention is also preferably characterized in that the assembly composed of the Coriolis measuring tube and the compensating cylinder is supported in and attached to the housing by way of the ends of the Coriolis measuring tube or via special connecting tubes.

If and when the mass flowmeter according to this invention also includes the usual external housing, the structural design and geometric shape of the housing is important for optimal performance of the mass flowmeter according to this invention.

In typical fashion the external housing of the mass flowmeter according to this invention consists preferably of a circular, cylindrical casing and two housing end caps. It is desirable to configure the latter in a special way, characterized in that each housing end cap includes an end plate which is at least approximately cylindrical and faces away from the casing, and a connecting element which faces the casing.

In terms of the design of the external housing, i.e. the housing end caps thereof, a particularly preferred embodiment of the mass flowmeter according to this invention is characterized in that the outer diameter of the cylindrical end plates of the housing end caps is limited to what is functionally necessary and that, in the longitudinal direction, the connecting elements have an at least approximately parallelogram-shaped cross section, with the longer axis of the parallelogram extending from the end plate to the casing while the cross-sectional area of the connecting elements is substantially larger than the cross-sectional area of the end plates.

BRIEF DESCRIPTION OF THE DRAWINGS

In specific terms, there are numerous ways to design and further enhance the mass flowmeter according to this invention. In this context, reference is made to the dependent claims and to the description of a preferred design example in conjunction with the drawings in which:

DESCRIPTION OF THE PREFERRED EMBODIMENT

Figure 1:
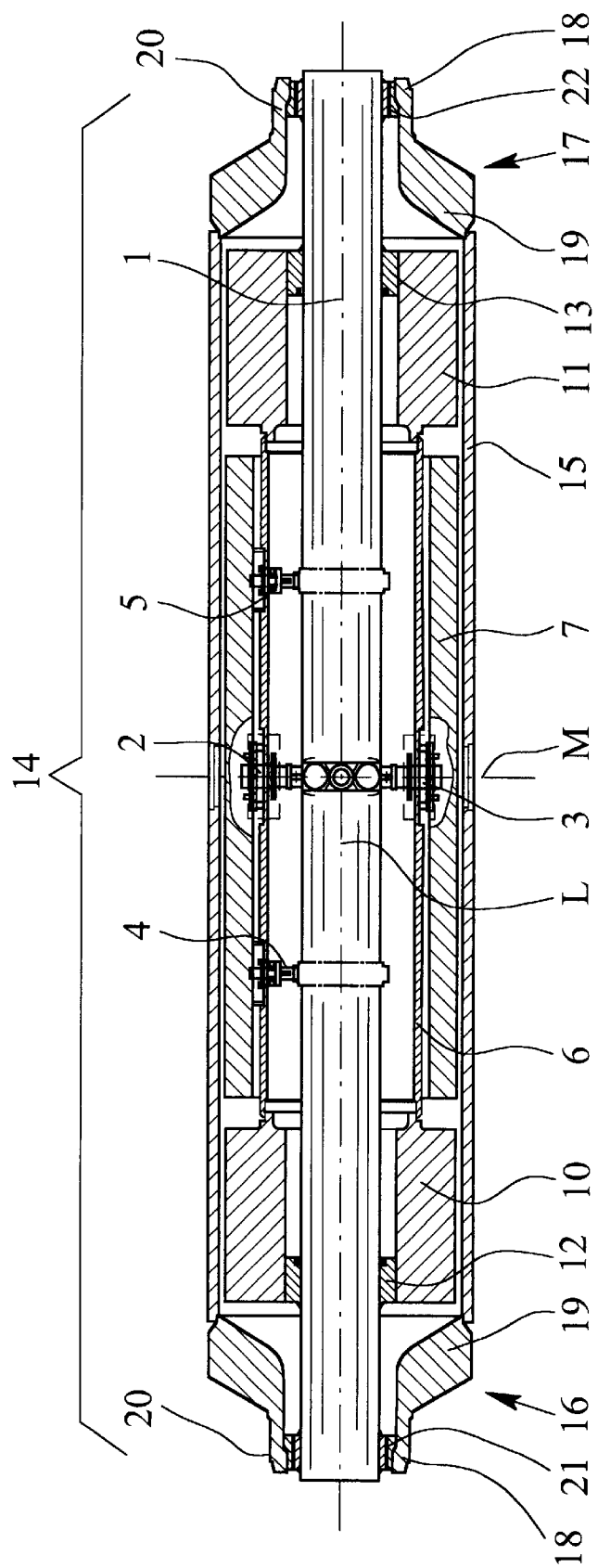
FIG. 1 is a longitudinal section through a preferred design example of a mass flowmeter according to this invention.
Figure 2:
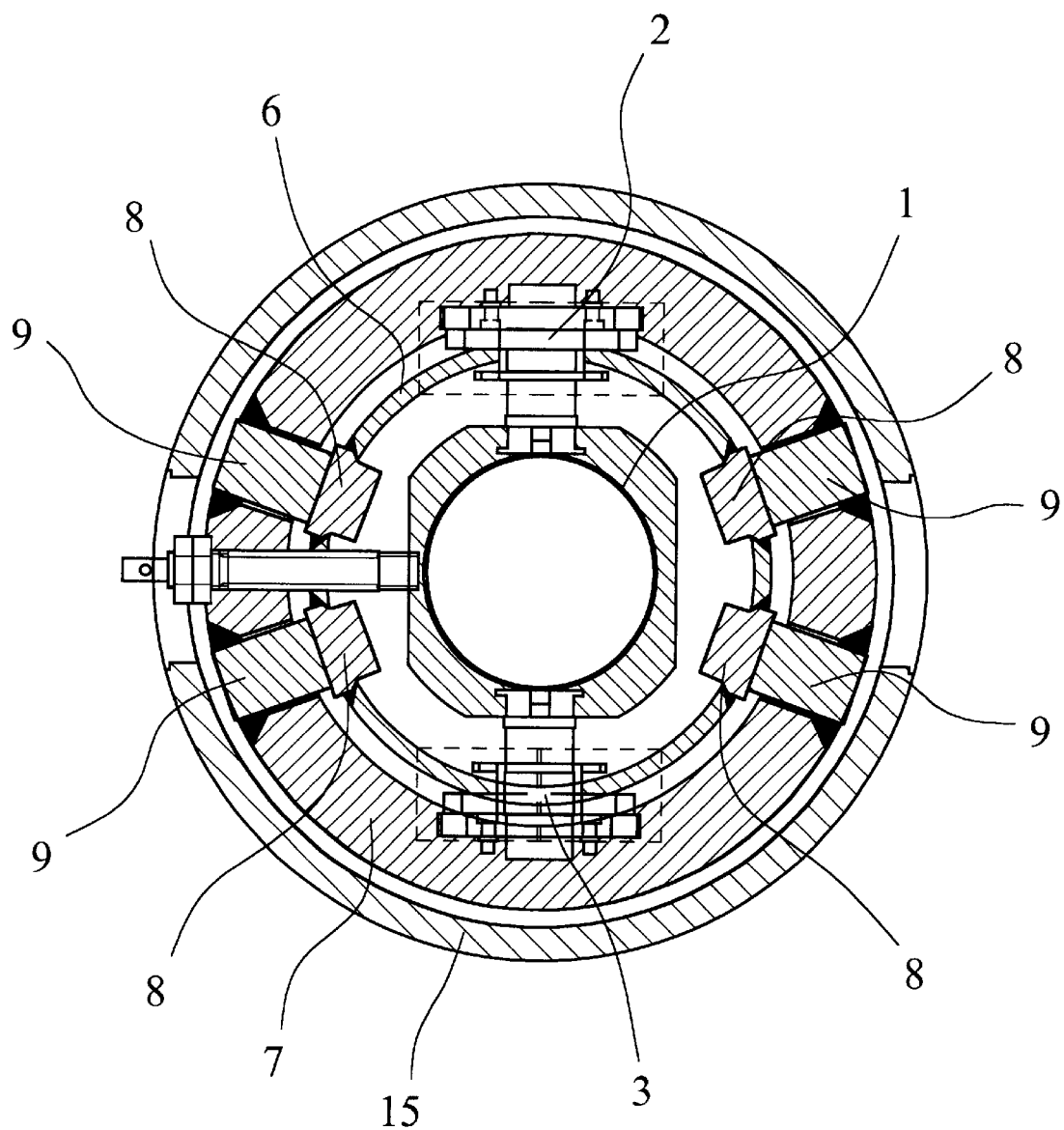
FIG. 2 is a cross section through the FIG. 1 mass flowmeter and specifically through its center plane M.

FIGS. 1 and 2 show a moving-fluid mass flowmeter based on the Coriolis operating principle, incorporating a straight, fluid-conducting Coriolis measuring tube 1, two oscillators 2, 3 acting on the Coriolis measuring tube 1, two detectors 4, 5 serving to measure the Coriolis forces and/or the Coriolis oscillations derived from Coriolis forces, and a compensating cylinder 6. The Coriolis measuring tube 1 is positioned inside the compensating cylinder 6, and the Coriolis measuring tube 1 and the compensating cylinder 6 are mechanically connected to each other.

According to this invention, provisions are made whereby in terms of mass the oscillatory system consisting of the Coriolis measuring tube 1 and the compensating cylinder 6 along with the oscillators 2, 3 and the detectors 4,5 is at least largely or, ideally, completely equalized for both the excitation oscillation of the Coriolis measuring tube 1 and the Coriolis oscillation of the Coriolis measuring tube 1. "Equalized" in this case means that neither the excitation oscillation nor the Coriolis oscillation has any "active" effect outside the assembly consisting of the Coriolis measuring tube 1, the oscillators 2, 3, the detectors 4, 5 and the compensating cylinder 6. In other words, in a mass equalization, ideally complete, the center of mass of the aforementioned assembly is stationary so that the problems referred to further above and usually inherent in mass flowmeters operating by the Coriolis principle and employing only one straight Coriolis measuring tube are avoided.

In the preferred design example of a mass flowmeter according to this invention as illustrated in FIGS. 1 and 2, mass equalization for the excitation oscillation of the Coriolis measuring tube 1 is realized in the form of a first equalization provision, and mass equalization for the Coriolis oscillation of the Coriolis measuring tube 1 is realized in the form of a second, different equalization provision. The following describes the implementation in detail:

As can be seen in FIGS. 1 and 2, mass equalization for the excitation oscillation is accomplished by means of a first equalization mass 7 connected to the compensation cylinder 6 along the center plane M and perpendicular to the longitudinal axis L of the same. The first equalization mass 7 is so chosen, dimensioned and positioned that the resonant frequency of the compensating cylinder 6 and the first equalizing mass 7 is substantially lower than the resonant frequency of the Coriolis measuring tube 1.

In the design example illustrated, the wall of the Coriolis measuring tube 1 is relatively thin. For a certain size of the mass flowmeter according to this invention, it may be about 1 mm. Wherever in the following description dimensional measures are indicated, they apply to a mass flowmeter according to this invention in which the wall of the Coriolis measuring tube is about 1 mm thick.

As shown in the design example according to FIGS. 1 and 2, the first equalization mass 7 is in the form of an equalization cylinder which is concentric with and extends over much of the length of the compensation cylinder 6.

For the design example of a mass flowmeter according to this invention, the wall thickness of the compensating cylinder 6 may be greater than the wall thickness of the Coriolis measuring tube 1, preferably about 3 to 5 mm and especially 4 mm, while the wall thickness of the first equalizing mass 7 in the form of an equalization cylinder is greater than the wall thickness of the compensating cylinder and preferably about three to ten times and especially about five times as thick as the wall of the compensating cylinder 6.

Figure 3:
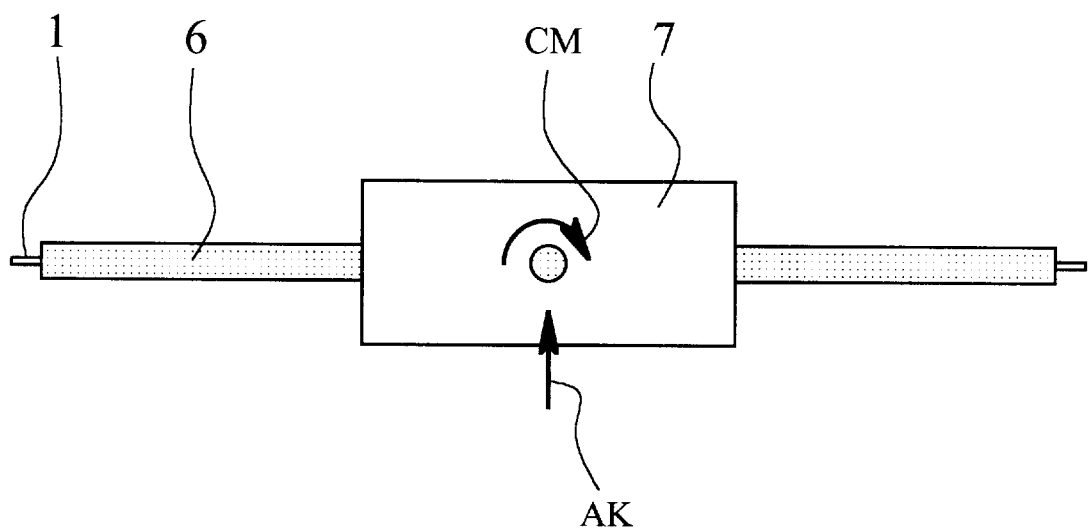
FIG. 3 is a diagrammatic view illustrating the design example of a mass flowmeter according to the invention as shown in FIGS. 1 and 2.

The design example of a mass flowmeter according to this invention as shown in FIGS. 1 and 2 incorporates a particularly significant provision, characterized in that the connection between the first equalizing mass 7 and the compensating cylinder 6 is rigid relative to the excitation force AK outlined in FIG. 3, but soft relative to the Coriolis factor CM, outlined in FIG. 3, resulting from the Coriolis force. The connection between the first equalizing mass 7 and the compensating cylinder 6 is thus established in a way that the excitation oscillation of the Coriolis measuring tube 1 acts on the first equalizing mass 7 whereas the Coriolis oscillation of the Coriolis measuring tube 1 cannot have any, or at least no significant, active effect on the first equalizing mass 7.

In the design example per FIG. 2, the provision explained above relative to the connection of the equalizing mass 7 with the compensating cylinder 6 is implemented by equipping the compensating cylinder 6 with four support heads 8 and the first equalizing mass 7 with four support pins 9, with the support pins 9 of the first equalizing mass 7 engaging in the support heads 8 of the compensating cylinder 6 in such fashion that, as explained above, excitation forces AK can be transferred from the compensation cylinder 6 to the first equalizing mass 7 while the Coriolis factor CM, outlined in FIG. 3, cannot be transmitted from the compensating cylinder 6 to the first equalizing mass 7.

The connection between the first equalizing mass and the compensating cylinder could also be made for instance by way of leaf springs which are rigid in their main plane but relatively soft perpendicular to their main plane.

In the design example of a mass flowmeter according to this invention, as shown in FIGS. 1 and 2, the mass-equalizing provision for the Coriolis oscillation is in the form of a second equalizing mass 10 and a third equalizing mass 11, the second equalizing mass 10 and the third equalizing mass 11 being implemented as end sections of the compensating cylinder 6. Instead of making reference to a design where the second equalizing mass 10 and the third equalizing mass 11 are in the form of end sections of the compensating cylinders, meaning that the equalizing mass 10 and the equalizing mass 11 are integral to the compensation cylinder 6, the design example illustrated could equally well be described as a configuration where the second equalizing mass 10 and the third equalizing mass 11 are provided in addition to, and are connected to, the compensating cylinder 6. The following description, however, will limit itself to the former approach.

Continuing with the description of the design example illustrated, the wall thickness of the second equalizing mass 10 and that of the third equalizing mass 11 is substantially greater than the wall thickness of the compensating cylinder 6, preferably by a factor of five to ten and especially by a factor of 7. At the same time, the length of the second equalizing mass 10 and the length of the third equalizing mass 11 is in each case so chosen as to correspond to about 15 to 25% and, more specifically, to about 17 to 20% of the overall length of the compensating cylinder 6.

Further above it has been stated several times that the Coriolis measuring tube 1, the oscillators 2, 3, the detectors 4, 5 and the compensating cylinder 6 together constitute one assembly. Accordingly, in the design example according to FIGS. 1 and 2, the end of the second equalizing mass 10 and the end of the third equalizing mass 11 of the compensating cylinder 6 are connected to the Coriolis measuring tube 1 by way of a connecting ring 12 and 13, respectively. The connection between the connecting rings 12, 13 and the Coriolis measuring tube 1 is preferably made by brazing and the connection between the end of the second equalizing mass 10 and, respectively, the end of the third equalizing mass 11 to the connecting rings is preferably made by brazing or shrink-fitting. However, the connection between the connecting rings 12, 13 and the Coriolis measuring tube 1 and the connection between the ends of the second equalizing mass 10 and, respectively, the third equalizing mass 11 and the connecting rings 12, 13 can be made by any other technical means suitable for the material used.

It was stated at the outset that in mass flowmeters of the type discussed the oscillator or oscillators and, respectively, the detector or detectors must be associated with the Coriolis measuring tube. In the design example both the oscillators 2, 3 and the detectors 4, 5 are provided between the Coriolis measuring tube 1 and the compensating cylinder 6. Specifically, in keeping with the current state of the art, a part of the oscillators 2, 3 and a part of the detectors 4, 5 are connected to the Coriolis measuring tube and the respective other part of the oscillators 2, 3 and of the detectors 4, 5 is connected to the compensating cylinder 6. The oscillators 2, 3 and the detectors 4, 5 employed may be of the conventional type which obviates the need for any further explanation in that regard.

It can also be seen in FIG. 1 that in the case of the mass-equalizing provision for the Coriolis oscillation, the distance between each of the detectors 4, 5 and the center plane M of the compensating cylinder 6 differs from the distance between each of the detectors 4, 5 and the corresponding end of the compensating cylinder 6, i.e. the corresponding end of the second equalizing mass 10 and the third equalizing mass 11.

The description of the mass flowmeter according to this invention has so far covered the functionally required components. However, the mass flowmeter according to this invention also includes an external housing 14. Supported by and attached to this housing 14 is the assembly composed of the Coriolis measuring tube 1, the oscillators 2, 3, the detectors 4, 5 and the compensating cylinder 6, in the design example shown by way of end sections of the Coriolis measuring tube 1 which extend on both sides beyond the compensating cylinder 6, i.e. beyond the second equalizing mass 10 and the third equalizing mass 11.

In the design example of a mass flowmeter according to this invention the external housing consists, in traditional fashion, of a circular cylindrical casing 15 and two housing end caps 16, 17. Each housing end cap 16, 17 includes an essentially cylindrical end plate 18 facing away from the casing 15, and a connecting element 19 facing the casing.

As is evident from FIG. 1, the design example of a mass flowmeter according to this invention is specially configured in terms of the external housing 14 in that the cylindrical end plates 18 of the housing end caps 16, 17 are limited to a functionally necessary minimum outer diameter and are provided with an outside thread 20 for screwing on flanges, not illustrated, while in the longitudinal direction the connecting elements 19 of the housing end caps 16, 17 have an essentially parallelogram-shaped cross section, with the longer axis of the parallelogram extending between the casing 15 and the cylindrical end plate 18 and the cross-sectional area of the connecting elements 19 of the housing end caps 16, 17 being substantially larger than the cross-sectional area of the cylindrical end plates 18.

It can also be seen in FIG. 1 that, in the design version illustrated, each of the ends of the Coriolis measuring tube 1 is connected to the housing via a connecting ring 21 or 22, respectively.

Finally, it should also be pointed out that the mass flowmeter according to this invention is symmetrical relative to the center plane M, referred to above as the center plane M of the compensating cylinder 6. This applies to all constituent components, especially also to the components according to this invention, i.e. the first equalizing mass 7, the second equalizing mass 10 and the third equalizing mass 1, as well as the housing end caps 16, 17.

Figure 4:
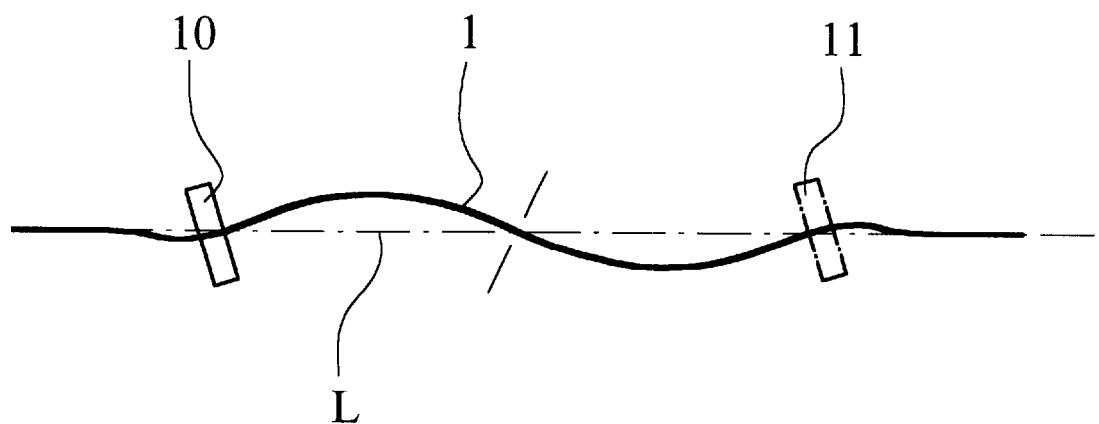
FIG. 4 is a similar view explaining the principle of the mass flowmeter according to this invention as shown in FIGS. 1 and 2.

The sketch in FIG. 3 only outlines the Coriolis measuring tube 1, the compensating cylinder 6 and the first equalizing mass 7. Also indicated are the excitation force AK generated by the oscillators 2, 3 illustrated in FIGS. 1 and 2, and the Coriolis moment or factor CM engendered by the Coriolis force. The sketch in FIG. 4 only shows in schematic fashion the Coriolis oscillation of the Coriolis measuring tube 1. In reality, however, the Coriolis oscillation of the Coriolis measuring tube 1 is superpositioned over the excitation oscillation, not shown, of the Coriolis measuring tube 1. FIG. 4 also outlines the second equalizing mass 10 and the third equalizing mass 11. It can be seen in FIG. 4 that, for the Coriolis oscillation of the Coriolis measuring tube 1, the second equalizing mass 10 and the third equalizing mass 11 allow said second equalizing mass 10 and said third equalizing mass 11 for the Coriolis oscillation of the Coriolis measuring tube 1 to bring about mass equalization.

What is claimed is:

1. A mass flowmeter operating by the Coriolis principle, incorporating one essentially straight, moving-fluidconducting Coriolis measuring tube (1), at least one oscillator (2, 3) associated with the Coriolis measuring tube (1) and exciting said Coriolis measuring tube (1), at least one detector (4, 5) associated with the Coriolis measuring tube (1) and serving to measure Coriolis forces and/or Coriolis oscillations derived from Coriolis forces, and a compensating cylinder (6), said Coriolis measuring tube (1) being positioned within the compensating cylinder (6) and said Coriolis measuring tube (1) and the compensating cylinder (6) being mechanically connected with each other, wherein as a mass-equalization provision for the excitation oscillation, a first equalizing mass (7) is employed and is connected to the compensating cylinder (6) in the center plane (M), extending perpendicular to the longitudinal axis (L), of the compensating cylinder (6), and as a mass-equalization device for the Coriolis oscillation, a second equalizing mass (10) and a third equalizing mass (11) are provided and the said second equalizing mass (10) and the third equalizing mass (11) are incorporated as end sections of the compensating cylinder (6).

2. The mass flowmeter defined in claim 1, characterized in that the resonant frequency of the compensating cylinder (6) and the first equalizing mass (7) is substantially lower than the resonant frequency of the Coriolis measuring tube (1).

3. The mass flowmeter defined in any one of claim 1 or 2, characterized in that the wall of the Coriolis measuring tube (1) is relatively thin, its thickness preferably being only about 1 mm.

4. The mass flowmeter defined in claim 1 or 2, characterized in that the first equalizing mass (7) is in the form of an equalizing cylinder that is concentric with the compensating cylinder (6).

5. The mass flowmeter defined in claim 4, characterized in that the first equalizing mass (7) in the form of an equalizing cylinder extends over a significant portion of the length of the compensating cylinder (6).

6. The mass flowmeter defined in claim 4, characterized in that the wall of the compensating cylinder (6) is thicker than the wall of the Coriolis measuring tube (1), preferably about 3 to 5 mm and more specifically about 4 mm.

7. The mass flowmeter defined in claim 4, characterized in that the wall of the equalizing cylinder constituting the first equalizing mass (7) is thicker than the wall of the compensating cylinder (6), preferably by a factor of three to ten and more specifically five times the wall thickness of the compensating cylinder (6).

8. The mass flowmeter defined in claim 1 or 2, characterized in that the first equalizing mass (7) is connected to the compensating cylinder (6) in rigid fashion relative to the excitation force (AK) but in soft fashion relative to the Coriolis moment (CM) resulting from the Coriolis force.

9. The mass flowmeter defined in claim 1 or 2, characterized in that the wall thickness of the second equalizing mass (10) and of the third equalizing mass (11) is substantially greater than the wall thickness of the basic compensating cylinder (6), preferably by a factor of five to ten, and more specifically seven times the wall thickness of the basic compensating cylinder (6).

10. The mass flowmeter defined in claim 1 or 2, characterized in that the length of the second equalizing mass (10) and the length of the third equalizing mass (11) each correspond to about 15 to 25%, and more specifically about 17 to 20%, of the overall length of the compensating cylinder.

11. The mass flowmeter defined in claim 1 or 2, characterized in that, at both the end of the second equalizing mass (10) and the end of the third equalizing mass (11), the compensating cylinder (6) is connected to the Coriolis measuring tube (1) by way of a connecting ring (12, 13).

12. The mass flowmeter defined in claim 11, characterized in that the connecting rings (12, 13) are connected to the Coriolis measuring tube (1) by brazing.

13. The mass flowmeter defined in claim 11, characterized in that, at the end of the second equalizing mass (10) and, respectively, at the end of the third equalizing mass (11), the compensating cylinder (6) is connected to the connecting rings (12, 13) by brazing or shrink-fitting.

14. The mass flowmeter defined in claim 1 or 2, characterized in that the oscillator or oscillators (2, 3) is/are positioned between the Coriolis measuring tube (1) and the compensating cylinder (6).

15. The mass flowmeter defined in any one of claims 1 to 2, characterized in that the detector or detectors (4, 5), is/are positioned between the Coriolis measuring tube (1) and the compensating cylinder (6).

16. The mass flowmeter defined in claim 1, incorporating two detectors (4, 5), characterized in that the distance between each of the detectors (4, 5) and the center plane (M) of the compensating cylinder (6) differs from the distance between each of the detectors (4, 5) and the respective end of the compensating cylinder (6), i.e. the respective end of the second equalizing mass (10) and the third equalizing mass (13).

17. The mass flowmeter defined in any one of claims 1 to 2, with an external housing (14), characterized in that the assembly composed of the Coriolis measuring tube (1) and the compensating cylinder (6) is supported in and attached to the housing (14) via the ends of the Coriolis measuring tube (1) or by way of special connecting tubes.

18. The mass flowmeter defined in claim 17, characterized in that each end of the Coriolis measuring tube (1) or of the special connecting tubes is connected to the housing (14) by way of a connecting ring (21, 22).

19. The mass flowmeter defined in claim 1 or 2, and further including an external housing (14) which consists preferably of a circular-cylindrical casing (15) and two housing end caps (16, 17).

20. The mass flowmeter defined in claim 19, characterized in that each housing end cap (16, 17) includes an at least essentially cylindrical end plate (18) facing away from the casing (15) and a connecting element (19) facing the casing (15).

21. The mass flowmeter defined in claim 20, characterized in that the outer diameter of the cylindrical end plates (18) of the housing end caps (16, 17) is limited to the functionally necessary dimension.

22. The mass flowmeter defined in claim 21, characterized in that the cylindrical end plates (18) of the housing end caps (16, 17) are provided with a male thread (20).

23. The mass flowmeter defined in claim 20, characterized in that, in the longitudinal direction, the connecting elements (19) of the housing end caps (16, 17) have an at least essentially parallelogram-shaped cross section, with the larger axis of the parallelogram extending between the casing (15) and the end plate (18).

24. The mass flowmeter defined in claim 23, characterized in that the cross-sectional area of the connecting elements (19) of the housing end caps (16, 17) is substantially larger than the cross-sectional area of the end plates (18).

* * * * *